United States Patent Office 3,478,090
Patented Nov. 11, 1969

---

3,478,090
PREPARATION OF CARBAMOYLSULFONATES
Dietrich H. Heinert, Midland, Mich., assignor to The Dow Chemical Company, Midland, Mich., a corporation of Delaware
No Drawing. Filed Oct. 26, 1966, Ser. No. 589,528
Int. Cl. C07c *143/86;* C08g *53/08*
U.S. Cl. 260—502.6        5 Claims

ABSTRACT OF THE DISCLOSURE

The corresponding salt of carbamoylsulfonic acid is prepared by contacting sulfur dioxide and a cyanate salt in the presence of water at about ambient temperature. The carbamoylsulfonate salt is useful as a chemical intermediate in reactions where it constitutes a form of cyanic acid to make carbamates and substituted ureas. Ammonium carbamoylsulfonate is a thermally decomposable blowing agent for making foamed plastics.

---

This invention relates to a new and advantageous chemical process. More particularly, it relates to an improved method for making carbamoylsulfonate salts of the formula

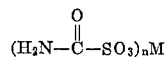

wherein M is any salt-forming cation such as a metal ion, an ammonium ion, or a substituted ammonium ion, and $n$ is the valence of M. It also relates to a novel compound made by the new process and to a method of using that compound.

Salts of carbamoylsulfonic acid are essentially bisulfite adducts of the unstable cyanic acid. Consequently, these salts represent a useful form of cyanic acid which can be employed in reactions for making cyanate and isocyanate derivatives where it would not be practical to use the free acid itself. For example, such carbamoylsulfonates can be reacted with active hydrogen compounds to make the corresponding carbamoyl compound and the metal bisulfite. Illustrative examples are the reaction of an alkali carbamoylsulfonate with an alcohol to produce the alkyl carbamate and the similar reaction with an amine to make a substituted urea.

The literature (German Patent 290,426, 1916) shows the preparation of potassium carbamoylsulfonate by the reaction of potassium cyanate with an excess of cold aqueous potassium bisulfite according to the following equation:

$$KHSO_3 + KCNO + H_2O \rightarrow H_2NCOSO_3K + KOH$$

This method not only employs an excess of the bisulfite reagent, but it also produces the byproduct KOH which must be removed from the desired product along with excess bisulfite or sulfite by thorough washing or recrystallization. Additionally, this method is not well adapted to the preparation of some carbamoylsulfonates because of the relative solubilities of the reagents involved. For example, in the reaction shown by the reference patent, the potassium salt product is insoluble and precipitates from the reaction mixture, thereby simplifying its separation and purification. However, when the sodium salts are used in that process, sodium sulfite is precipitated and the carbamoylsulfonate remains in solution.

There has now been discovered a new and improved process for making carbamoylsulfonate salts which avoids the above disadvantages of the prior art method and is well adapted to the efficient production of carbamoylsulfonate salts in general. This new method comprises reacting a cyanate salt, preferably a metal cyanate or an ammonium cyanate, with sulfur dioxide and water according to the following equation, using the sodium salt for purpose of illustration:

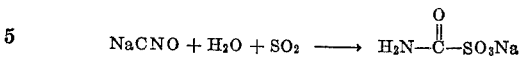

Since the carbamoylsulfonate is the sole product of the reaction, the efficient use of reagents and the separation of a pure product are greatly facilitated.

The ratio of reactants is not critical, for the reaction will take place as shown so long as some of each reactant is present. Therefore, it is apparent that the reaction can be carried out either in an aqueous medium or as an essentially dry process. Preferably, the process is run by passing sulfur dioxide gas into a water solution or suspension of the cyanate. Under these conditions, best results are obtained by using about 1.0–1.2 mole equivalents of sulfur dioxide per equivalent of cyanate. The water is present in considerable excess and its volume is determined by conditions of practical operation.

As noted above, the process can also be an essentially dry process wherein gaseous sulfur dioxide is passed through or over solid cyanate containing water present as extraneous moisture or as water of crystallization. Alternatively, the water may be present as water vapor in the stream of sulfur dioxide gas and the necessary excess of sulfur dioxide is recycled to pick up additional water vapor. Under these conditions, a substantially dry product can be made directly.

In either mode of operation, moderate to low reaction temperatures are employed. When the reaction is carried out in an aqueous medium, a temperature from the freezing point of the mixture to about 50° C. is appropriate. A similar temperature range is used for the dry process. Each of these modes of operation involves essentially the reaction of sulfur dioxide with the cyanate in an aquous mixture, even though the quantity of water may be very small. The lower temperature limit in either case is, therefore, the freezing point of that mixture.

Although any metal cyanate, ammonium cyanate, or the like can be used in the process, it is preferred for obvious reasons to use a cyanate which is at least moderately soluble in water. Such cyanates include ammonium cyanate and the cyanates of metals of Groups I and II of the periodic table. Particularly preferred are the alkali metal cyanates.

EXAMPLE 1

Gaseous sulfur dioxide was passed into a stirred solution of 81.1 g. of potassium cyanate in 400 ml. of water which was cooled by an ice bath to maintain the temperature at —5° C. to 20° C. during the addition. After the theoretical 64.1 g. of sulfur dioxide had been absorbed, the addition was stopped and the reaction mixture was stirred on the ice bath for an additional 15 minutes while its temperature was reduced to 5° C. The colorless crystalline precipitate which had formed during the reaction was separated by filtration, washed with ice water, and dried under reduced pressure at room temperature. The dry product was identified as the potassium salt of carbamoylsulfonic acid, weight 107.7 g.

EXAMPLE 2

A suspension of 131.8 g. of sodium cyanate in 400 ml. of water was cooled on an ice bath and 500 g. of ice was added to the mixture to adjust the temperature to 5° C. Sulfur dioxide was bubbled into the stirred mixture through a sintered glass tube while the temperature was maintained below 15° C. The suspended sodium cyanate gradually went into solution during the course of the reaction and completion of the reaction was indicated by the formation of a homogeneous solution. The weight of sulfur dioxide absorbed corresponded to the theoretical quantity of 128.2 g. Completion of the reaction is also indicated by a sharp decrease in pH of the aqueous mixture from approximately neutral to strongly acidic. Dissolved excess sulfur dioxide is easily removed from the final solution by brief exposure to reduced pressure.

Crystalline sodium carbamoylsulfonate was obtained by dilution of the reaction solution with 450 ml. of methanol and addition of 2650 ml. of tetrahydrofuran. The resulting crystal suspension was cooled at 0° C. for 12 hours and the crystalline product was filtered off and dried under reduced pressure at room temperature. There was obtained 260.2 g. of colorless crystals of sugar-like appearance. This material was identified as the monohydrate of sodium carbamoylsulfonate by elemental analysis and by infrared, mass spectral, and nuclear magnetic resonance analyses.

Ammonium carbamoylsulfonate can be prepared substantially as shown above from ammonium cyanate, but it is often more convenient to prepare this salt from an aqueous solution of the sodium salt by an ion exchange procedure as described below.

EXAMPLE 3

One liter of settled wet Dowex 50W ion exchange resin, acid form, was stirred with a liter of water and an excess of concentrated ammonium hydroxide. The neutralized resin was filtered, rinsed with water until the effluent was filtered, rinsed with water until the effluent was neutral, and then put in a three inch diameter column. Dowex 50W is a sulfonated styrene-divinylbenzene copolymer, a strong acid cation resin.

A solution of 165.1 g. of sodium carbamoylsulfonate in 320 ml. of water was then admitted to the top of the column and the solution was run through the neutralized resin at a moderate rate. The salt solution was followed with water. The forerun of water from the column was discarded and the eluate fraction of about pH 4.5 was collected. This fraction was freeze-dried at less than 0.1 mm. absolute pressure to obtain 100.2 g. of ammonium carbamoylsulfonate, a white crystalline solid which decomposes to cyanic acid, sulfur dioxide, water, and ammonia when heated above about 88° C. The crystalline product was identified as the compound named by elemental analysis and the several spectroscopic analyses previously listed.

Ammonium carbamoylsulfonate is weakly acidic in aqueous medium. This property in combination with its rapid decomposition to gaseous products at a moderate temperature makes it a useful agent for blow-curing of resins as shown in Example 4.

EXAMPLE 4

A mixture of 2 g. of ammonium carbamoylsulfonate and 20 g. of a phenol-formaldehyde resol resin was heated at 90° C. in an oven. In ten minutes of heating, the resin was foamed and cured to a stable polymer foam. Unlike foams cured with HCl, this foam showed stability against air oxidation for several months.

In a manner similar to that shown in the foregoing example, ammonium carbamoylsulfonate can be employed as a thermally decomposable blowing agent to make foams of other thermoplastic or thermoset plastics by heating a mixture of the ammonium salt with such a plastic to a temperature where decomposition of the salt occurs.

Preferably, this temperature is at least about 85° C., for relatively rapid decomposition to gaseous products begins at about this point. However, slow decomposition begins at about 50° C. and plastic can be foamed, although more slowly, by somewhat more prolonged heating of their mixtures with the ammonium salt at 50° C. of above.

By a procedure such as described in Examples 1–3, other metal carbamoylsulfonates can be prepared. For example, using the general procedure of Examples 1 and 2, inorganic cyanates such as calcium cyanate, cadminum cyanate, and mercuric cyanate are reacted in water solution of suspension with sulfur dioxide to produce the corresponding carbamoylsulfonates. Alternatively, carbamoylsulfonates of low water solubility may be more conveniently prepared by reacting the metal chloride or other soluble salt with sodium carbamoylsulfonate in water solution.

I claim:
1. A process for making a carbamoylsulfonate salt which comprises reacting by contacting sulfur dioxide with a cyanate salt and water at a temperature from the freezing point of said mixture to above 50° C.
2. The process of claim 1 wherein the sulfur dioxide is contacted with a water solution of the cyanate.
3. The process of claim 2 wherein 1–1.2 moles of sulfur dioxide are contacted with a mole equivalent of cyanate.
4. The process of claim 2 wherein the cyanate is an alkali metal cyanate.
5. Ammonium carbamoylsulfonate.

References Cited

FOREIGN PATENTS 290,426  2/1916  Germany.

OTHER REFERENCES

Petersen, Liebig's Annalen 562, 205, 216 (1949).

DANIEL D. HORWITZ, Primary Examiner

U.S. Cl. X.R.

260—2.5